United States Patent
Sugawara et al.

[11] Patent Number: 5,844,975
[45] Date of Patent: Dec. 1, 1998

[54] COMMUNICATION APPARATUS CONNECTED TO LINE OF SWITCHING NETWORK PROVIDING CALLER TELEPHONE NUMBER INFORMING SERVICE

[75] Inventors: Naoki Sugawara, Yokohama; Makoto Kobayashi, Kawasaki, both of Japan

[73] Assignee: Canon Kabushiki Kaisha, Tokyo, Japan

[21] Appl. No.: 652,413

[22] Filed: May 23, 1996

[30] Foreign Application Priority Data

May 26, 1995 [JP] Japan ................. 7-152438

[51] Int. Cl.6 ................. H04M 1/56; H04M 15/06
[52] U.S. Cl. ................. 379/142; 379/93.02; 379/93.17; 379/93.23; 379/182; 379/354
[58] Field of Search ................. 379/94, 96, 98, 379/100, 142, 199, 372, 373, 379, 441, 442, 354, 90.01, 93.01, 93.02, 93.03, 93.09, 93.11, 93.17, 93.18, 93.23, 67, 127, 182, 183, 376, 387

[56] References Cited

U.S. PATENT DOCUMENTS

| | | | |
|---|---|---|---|
| 5,343,516 | 8/1994 | Callele et al. ................. | 379/98 |
| 5,351,289 | 9/1994 | Logsdon et al. ................. | 379/142 |
| 5,377,260 | 12/1994 | Long ................. | 379/142 |
| 5,388,150 | 2/1995 | Schneyer et al. ................. | 379/142 |
| 5,517,557 | 5/1996 | Tanaka ................. | 379/142 |
| 5,671,269 | 9/1997 | Egan et al. ................. | 379/88 |
| 5,727,047 | 3/1998 | Bentley et al. ................. | 379/93.05 |
| 5,734,706 | 3/1998 | Windsor et al. ................. | 379/142 |

Primary Examiner—Curtis A. Kuntz
Assistant Examiner—Binh K. Tieu
Attorney, Agent, or Firm—Fitzpatrick, Cella, Harper & Scinto

[57] ABSTRACT

A communication apparatus connected to a line of a switching network providing a caller identification information informing service includes a detection unit for detecting the identification information when a call is received, a send unit for sending the identification information detected by the detection unit to an external information processing terminal and a control unit for controlling the communication operation with a calling station in accordance with a command signal from the information processing terminal.

18 Claims, 4 Drawing Sheets

COMMUNICATION APPARATUS CONNECTED TO LINE OF SWITCHING NETWORK PROVIDING CALLER TELEPHONE NUMBER INFORMING SERVICE

BACKGROUND OF THE INVENTION

1. Field of the Invention

The present invention relates to a communication apparatus connected to a line of a switching network providing a caller telephone number informing service.

2. Related Background Art

A service of a switching network for informing a caller telephone number to a called station (hereinafter referred to as a caller ID service) has been recently available. A telephone set compatible to such a caller ID service has a compact display device (LCD) of one or two lines to display received caller identification information (telephone number) on the display device to allow an operator of the called station to identify an originator of the call. Such a telephone set is disclosed in Japanese Patent Publication No. 6-52914 (1994). The telephone set disclosed therein displays caller identification information received when the call is received, resets the display by the reception of a next call and resets the caller identification information for each reception of call. An operator may identify an originator of the call by watching the caller telephone number.

It is proposed to provide a function corresponding to the caller ID service in a facsimile apparatus and check a caller telephone number received from a network when a call is received in order to automatically select whether facsimile reception is permitted or rejected.

Usually, an apparatus having an automatic communication function such as a facsimile apparatus is frequently installed remotely from an operator. Accordingly, telephone numbers of stations which are allowed for reception and telephone numbers of stations which are to be rejected for reception are registered in the apparatus and the telephone number received when the call is received is compared with the registered telephone numbers to automatically control the communication operation.

Accordingly, the automatic communication is not attained for a call from a station not registered in the apparatus, or an unnecessary direct mail sent from a new station cannot be rejected for reception. Thus, it is proposed to connect a dedicated telephone set compatible to the caller ID service in the facsimile apparatus compatible to the caller ID service and install the dedicated telephone set at a site of the operator, so that the operator may check a caller by the display on the dedicated telephone set compatible to the caller ID service when a call is received from an unregistered caller and control the facsimile apparatus by a remote signal from the dedicated telephone set. However, when viewed as a total system, the duplicate configuration to receive the caller telephone number from the network, arranged in the telephone set and the facsimile apparatus, is wasteful. Further, the control of the facsimile apparatus by the remote signal by dialing keys of the dedicated telephone set is troublesome for the operator.

A personal computer has become widely used and a system which connects a facsimile apparatus to a personal computer for use as a peripheral device of the personal computer has been known.

SUMMARY OF THE INVENTION

It is an object of the present invention to improve a communication apparatus so as to remove the above-mentioned drawbacks.

It is another object of the present invention to provide a communication apparatus which informs caller identification received from a network when a call is received in order to an external information processing terminal and executes a communication operation in accordance with a command from the information processing terminal.

Other objects of the present invention will be apparent from the following detailed description of the preferred embodiments and the accompanying drawings.

DETAILED DESCRIPTION OF THE PREFERRED EMBODIMENTS

An embodiment of the present invention is now explained in detail with reference to the accompanying drawings.

Figure 1:
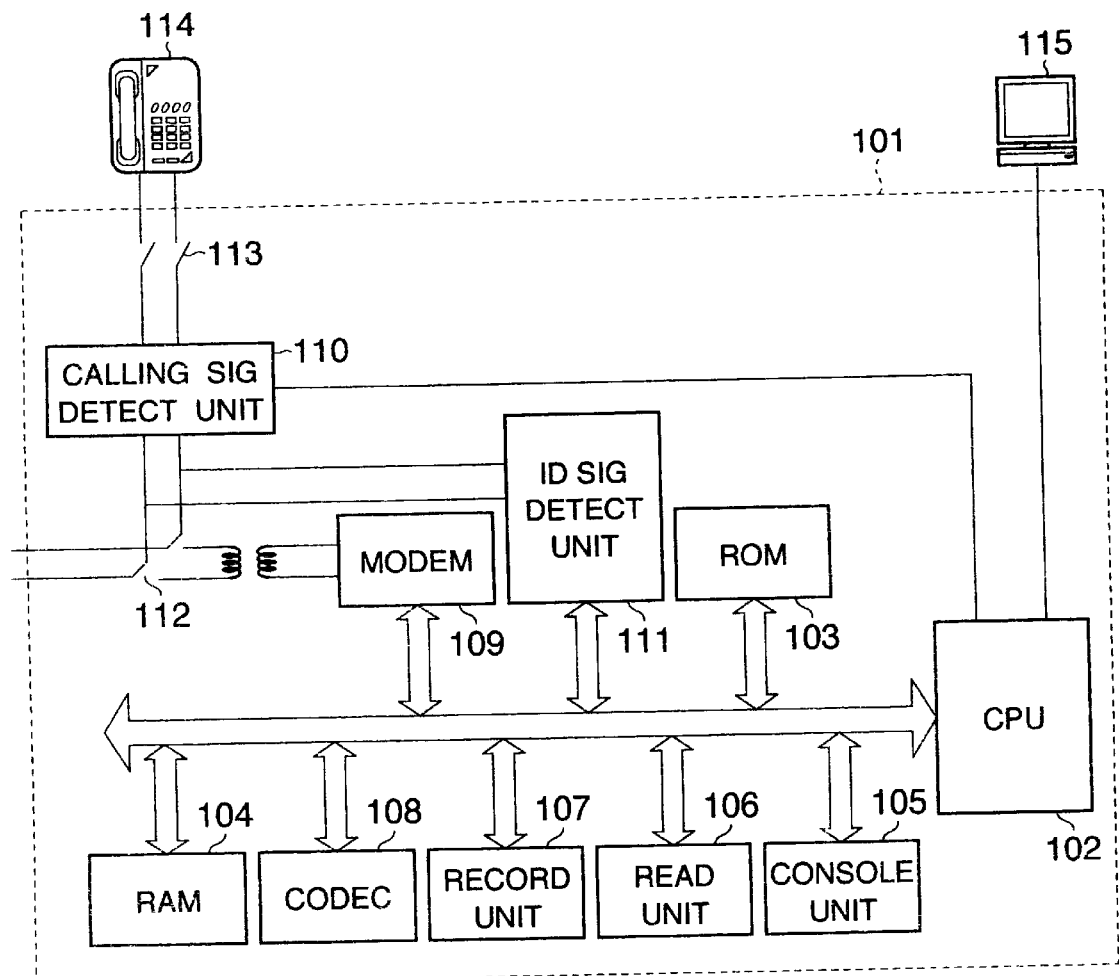
FIG. 1 shows a configuration of a facsimile apparatus of an embodiment of the present invention.

FIG. 1 shows a block diagram of a basic configuration of a facsimile apparatus of one embodiment of the present invention.

A facsimile apparatus 101 is connected to a switching system (not shown) providing a service to send caller identification information between call signals.

The facsimile apparatus 101 comprises a CPU 102 for controlling an entire apparatus, a ROM 103 for storing a control program of the CPU 102 and a RAM 104 for storing image data and registered data.

It also comprises a console unit 105 for entering various inputs, a read unit 106 for reading a document sheet, a record unit 107 for recording image data, a codec 108 for coding and decoding the image data, a modem 109 for detecting a line signal and performing transmission and reception with a destination station, a calling signal detection unit 110 for detecting a calling signal sent from a switching apparatus (not shown), an identification signal detection unit 111 for detecting caller identification information sent from the switching apparatus, a CML relay 112 for connecting a line with the modem 109 and an H relay 113 for connecting the line with a telephone set 114.

A computer 115 is connected to the facsimile apparatus 101 through a serial interface (not shown) such as RS232C so that various data may be exchanged between the CPU 102 and the computer 115.

Figure 2:
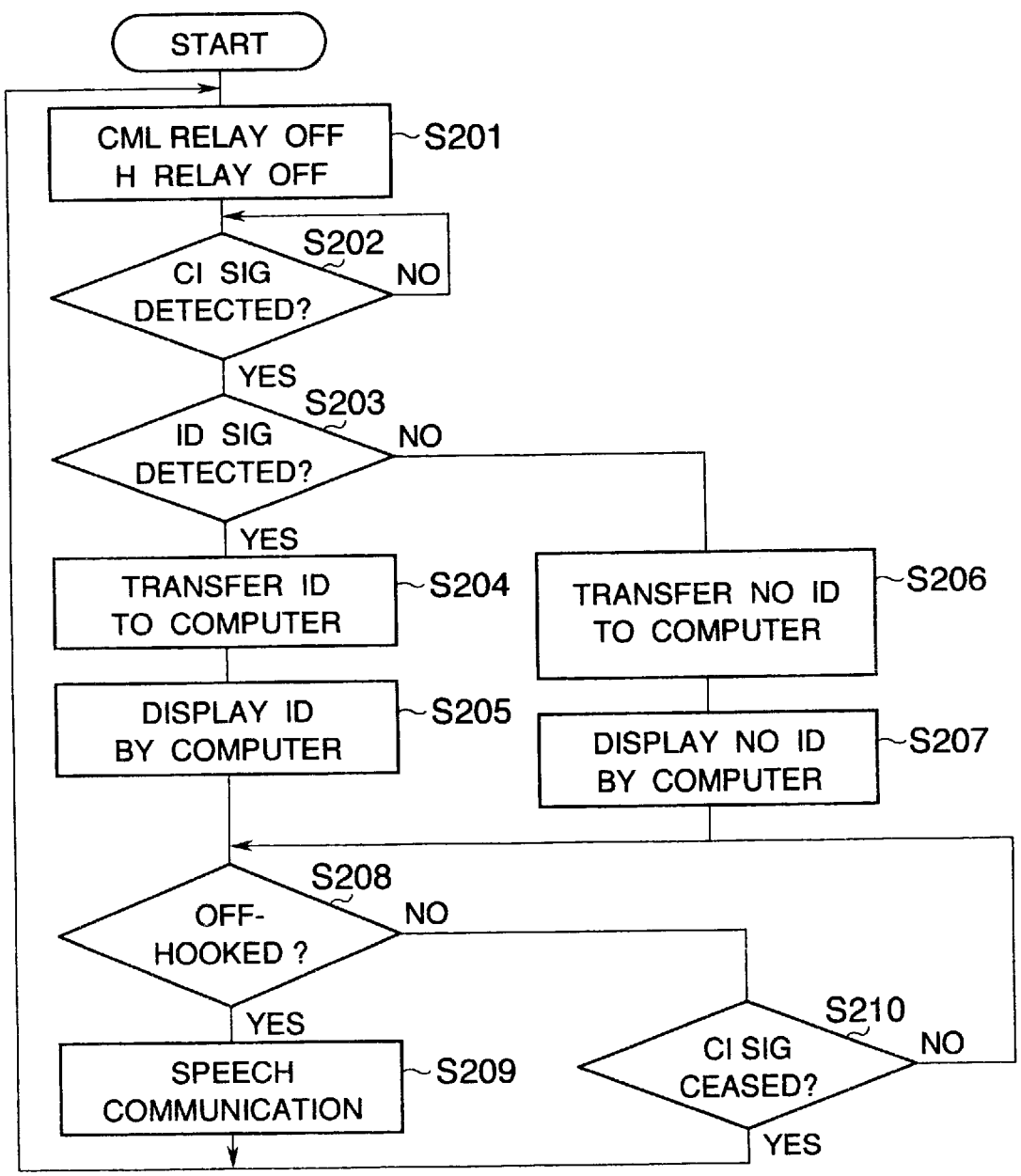
FIG. 2 shows a flow chart of an operation of the embodiment.

An operation when the facsimile apparatus 101 is set to a manual reception mode is explained with reference to a flow chart of FIG. 2.

Normally, the line is connected to the telephone set 114 by the off position of the CML relay 112 and the off position of the H relay 113 (S201). When a caller calls, he dials a called station telephone number by using the telephone set of the caller station.

Thus, the switching apparatus sends a calling signal (or CI signal) to the called station. It also sends caller identification information (telephone number) in the form of a FSK signal between calling signals.

When the facsimile apparatus 101 at the called station detects the calling signal by the calling signal detection circuit 110 (S202), it detects the caller identification information sent from the switching apparatus by the identification signal detection unit 111 before a next calling signal is received (S203). When the identification signal detection unit 111 detects the caller identification information, the facsimile apparatus 101 transfers the detected identification information to the computer 115 through the serial interface (S204).

The computer 115 displays the received identification information on a display unit such as a CRT display (S205). Thus, the operator watches the displayed identification information, and if it is a station from which telephone call is to be received, he hooks off the telephone set (S208) to make speech communication (S209). Alarm by voice may be generated together with the display in S205.

When the identification signal detection unit 111 cannot detect the caller identification information sent from the switching apparatus, it sends information indicating no identification information to the computer 115 (S206) so that the computer displays (No Telephone Number Information) (S207). Thus, the operator hooks off the telephone set if he wants to receive the call (S208) to make speech communication (S209). Alarm by voice may be generated together with the display in S207.

When the operator does not hook off the telephone set, he waits for the termination of the CI signal (S210) and then terminates the operation.

Figure 3:
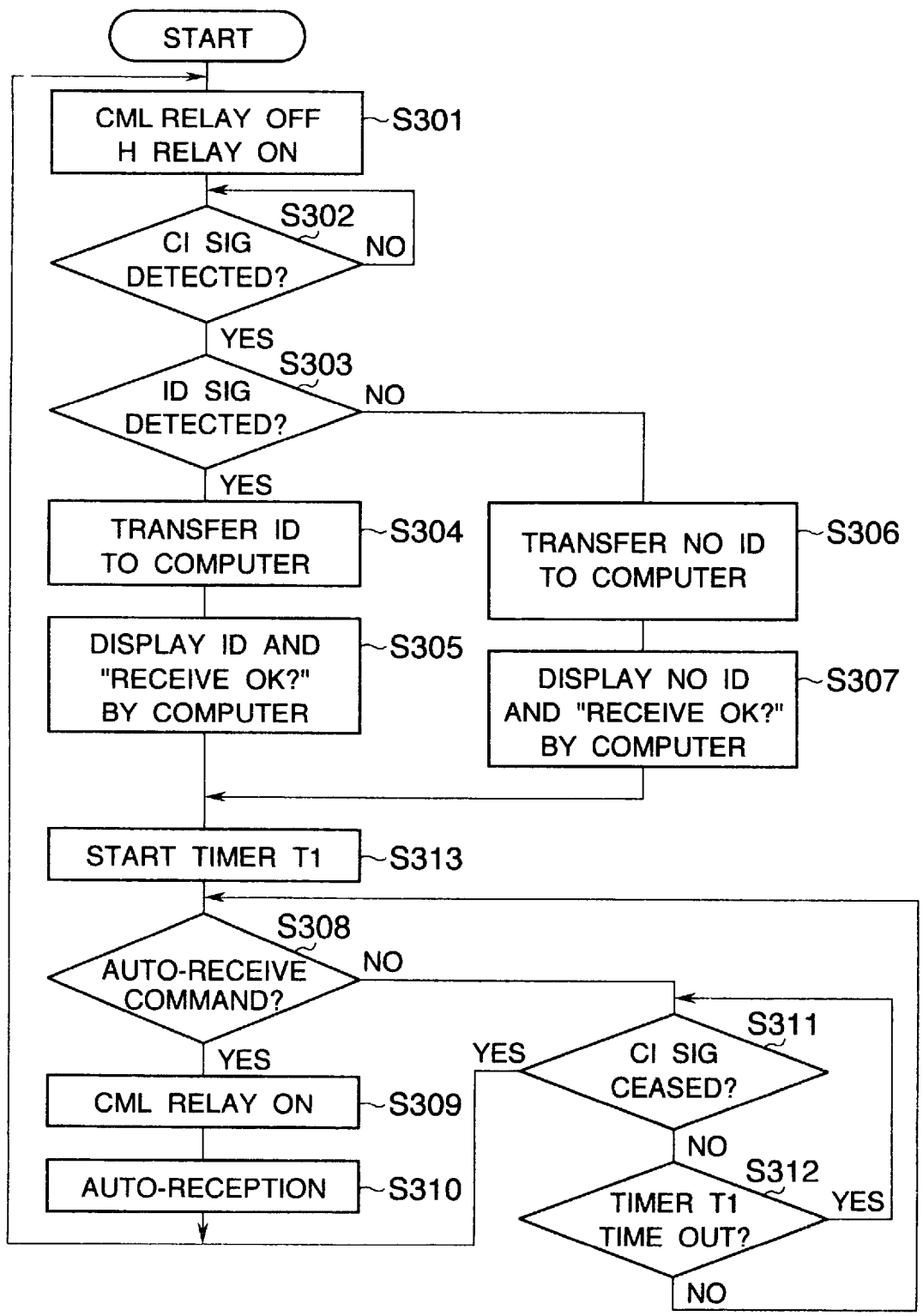
FIG. 3 shows a flow chart of an operation of the embodiment.

An operation when the facsimile apparatus 101 is set to an automatic reception mode is now explained with reference to a flow chart of FIG. 3.

Normally, the line is disconnected from the telephone set 114 by the on position of the CML relay 112 and the on position of the H relay 113 (S301). When a caller sends a fax message, he dials a telephone number of a called station by using the facsimile apparatus.

Thus, the switching apparatus sends a calling signal to the called station. It also sends the caller identification information (telephone number) in the form of a FSK signal between calling signals.

When the facsimile apparatus 101 at the called station detects the calling signal by the calling signal detection unit 110 (S302), it detects the caller identification information sent from the switching apparatus by the identification signal detection unit 111 before a next calling signal is received (S303). When the identification signal detection unit 111 detects the caller identification information, the facsimile apparatus 101 transfers the detected identification information to the computer 115 through the serial interface (S304).

The computer 115 displays the received identification information and a message "Receive?" on the display unit such as the CRT display and starts a T1 timer (S313). The operator watches the displayed identification information and if he wants the automatic reception, he enters "Y" from the keyboard of the computer 115. Thus, the computer 115 sends an automatic reception command to the facsimile apparatus 101 through the serial interface. Alarm by voice may be generated together with the display in S305.

When the facsimile apparatus 101 receives the automatic reception command (S308), it turns on the CML relay 112 (S309) to conduct the automatic reception (S310). If it does not receive the automatic reception command within a predetermined time interval (T1 timer), it does not conduct the automatic reception (S312). It waits for the termination of the CI signal and terminates the operation.

Figure 4:
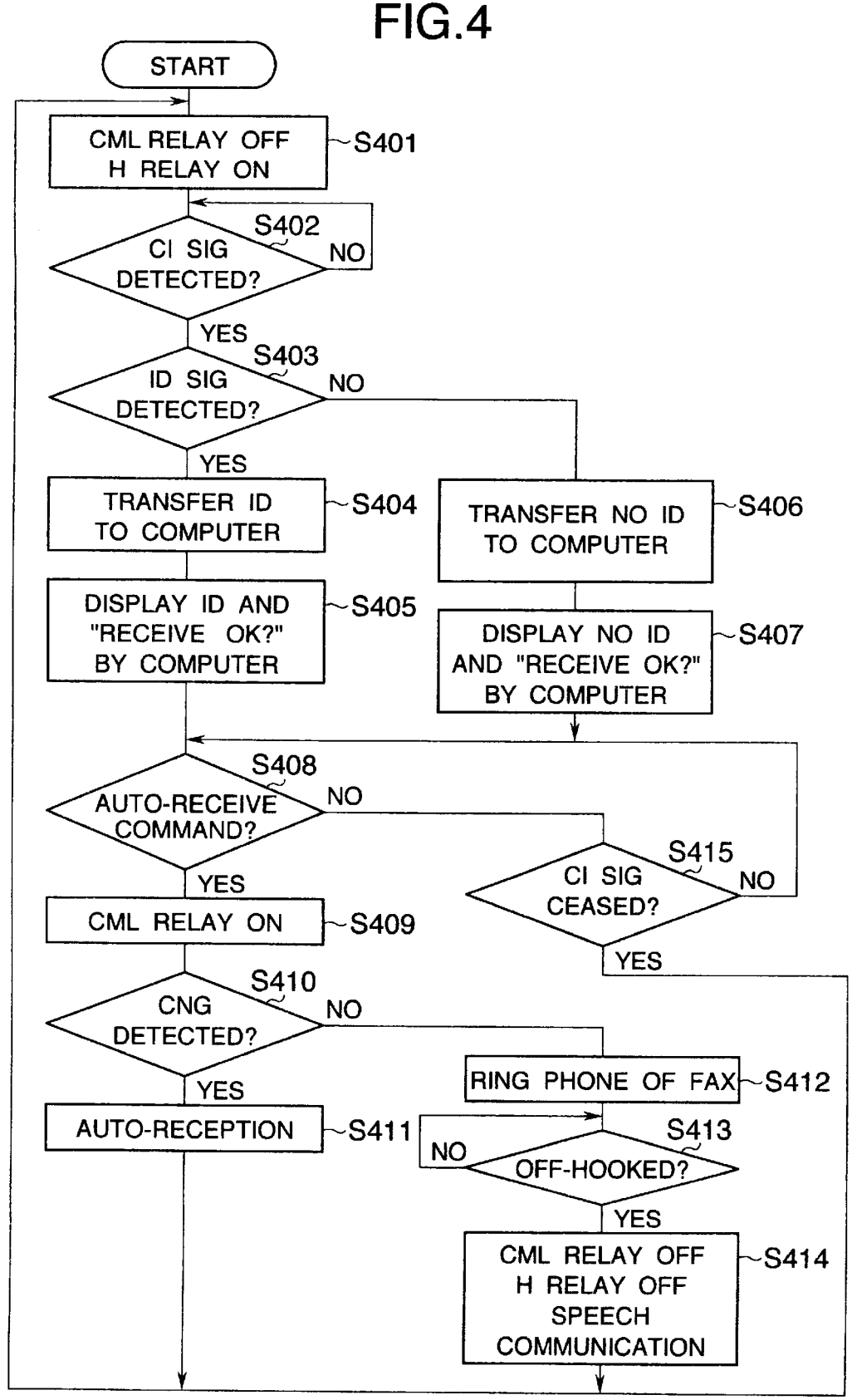
FIG. 4 shows a flow chart of an operation of the embodiment.

Finally, an operation when the facsimile apparatus 101 is set in a FAX/TEL automatic selection mode is explained with reference to a flow chart of FIG. 4.

Normally, the line is disconnected from the telephone set 114 by the off position of the CML relay 112 and the on position of the H relay 113 (S401). When a caller makes a telephone communication or a fax communication, he dials a telephone number of a called station.

Thus, the switching apparatus sends a calling signal to the caller station. It also sends a caller identification information (telephone number) in the form of a FSK signal between calling signals.

When the calling signal is detected by the calling signal detection circuit 110 (S402), the facsimile apparatus 101 at the called station detects the caller identification information sent from the switching apparatus by the identification signal detection unit 111 before a next calling signal is received (S403). When the identification signal detection unit 111 detects the caller identification information, the facsimile apparatus 101 transfers the detected identification information to the computer 115 through the serial port (S404).

The computer 115 displays the received identification information and a message "Receive?" on the display device such as the CRT display (S405). Alarm by voice may be generated together with the display in S405.

The operator watches the displayed identification information and if he wants to the automatic reception, he enters "Y" from the keyboard of the computer 115.

Thus, the computer 115 sends an automatic reception command to the facsimile apparatus 101 through the serial interface. When the facsimile apparatus 101 receives the automatic reception command (S408), it turns on the CML relay 112 (S409) and detects a CNG signal by the modem 109 (S410). When the CNG signal is detected, it indicates that the calling station is a facsimile apparatus, the reception operation is conducted as it is (S411).

If the CNG signal is not received, it indicates that the calling station is a telephone set and the telephone set 114 connected to the facsimile apparatus is called (S412). When the operator hooks off the telephone set (S413), the CML relay 112 is turned off, the H relay is turned off and speech communication is established (S414).

In the present embodiment, the identification information received by the facsimile apparatus is displayed by the computer to prompt to the caller to permit or reject of reception. Thus, it fits into a current office environment with widely used computers and provides a useful system.

In the above embodiment, the interface to connect the facsimile apparatus and the computer is not limited to the serial interface.

Further, in the above embodiment, the identification signal sent from the switching apparatus is not limited to the FSK signal.

Further, in the above embodiment, the computer is used as the information processing apparatus connected to the facsimile apparatus 101, although any other communication terminal having a display unit and a console unit may be equality used.

It should be understood that the present invention is not limited to the above embodiment and various modifications thereof may be made.

What is claimed is:

1. A communication apparatus connected to a line of a switching network providing a caller identification information informing service comprising:

first detection means for detecting a call from the line;

second detection means for detecting an identification information when a call is received;

sending means for sending the identification information detected by said second detection means to an external information processing terminal;

communication means for performing a predetermined communication through the line in response to the call detection by said first detection means; and control means for controlling the predetermined communication by said communication means in accordance with a command signal from the information processing terminal, wherein said communication means starts the predetermined communication in response to the call detection independently of the information processing terminal, and said control means terminates the communication in accordance with the command signal from the information processing terminal.

2. A communication apparatus according to claim 1 wherein when said detection means does not detect the identification information when the call is received, said send means informs to said external information processing terminal the non-reception of the identification information.

3. A communication apparatus according to claim 1 wherein, in a case where the command signal is not sent from said information processing terminal, said control means does not terminate the communication by said communication means.

4. A communication apparatus according to claim 1 wherein the communication operation with the calling station is speech communication.

5. A communication apparatus according to claim 1 wherein the communication operation with the calling station is data communication.

6. A communication apparatus according to claim 5 wherein the communication operation with the calling station is image data communication.

7. A communication system having a communication apparatus connected to a line of a switching network providing a caller identification information informing service and an information processing terminal connected to said communication apparatus;

said communication apparatus comprising:
first detection means for detecting a call from the line;
second detection means for detecting an identification information when a call is received;
sending means for sending the identification information detected by said second detection means to an external information processing terminal;
communication means for performing a predetermined communication through the line in response to the call detection by said first detection means; and
control means for controlling the predetermined communication by said communication means in accordance with a command signal from the information processing terminal;

said information processing terminal comprising:
receiving means for receiving the identification information from said communication apparatus;
display means for displaying information for identifying the calling station in accordance with the identification signal received by said receiving means;
input means for inputting a command to remotely control communication operation of said communication apparatus; and
sending means for generating the command signal in accordance with the input by said input means and sending the generated command signal to said communication apparatus, wherein said communication means starts a process for the predetermined communication in response to the call detection independently of the information processing terminal, and said control means terminates the communication in accordance with the command signal from the information processing terminal.

8. A communication system according to claim 7, wherein, in a case where the command signal is not sent from said information processing terminal, said control means does not terminate the communication by said communication means.

9. A communication system according to claim 7 wherein the communication operation with the calling station is speech communication.

10. A communication system according to claim 7 wherein the communication operation with the calling station is data communication.

11. A communication system according to claim 10 wherein the communication operation with the calling station is image data communication.

12. In a communication apparatus connected to a line of a switching network providing a caller identification information informing service, a communication method comprising the steps of:

first detecting of a call from the line;

second detecting of an identification information when the call is received;

sending the identification information detected in the second detecting step to an external information processing terminal;

starting and performing a process for a predetermined communication through the line in response to the call detection, the predetermined communication being performed independently of the information processing terminal; and terminating the predetermined communication in accordance with a command signal from the information processing terminal.

13. A communication method according to claim 12 comprising the step of, when the identification information from said switching network is not detected, informing to said information processing means the non-detection of the identification information.

14. A communication method according to claim 12, wherein, in a case where the command signal is not sent from said information processing terminal, the communication is not terminated. matter.

15. A communication method according to claim 12 wherein the communication operation with the calling station is speech communication.

16. A communication method according to claim 12 wherein the communication operation with the calling station is data communication.

17. A communication method according to claim 16 wherein the communication operation with the calling station is image data communication.

18. A communication method according to claim 12 wherein said information processing terminal displays information for identifying the calling station in accordance with the identification information informed from said communication apparatus, generates the command signal in response to a manual entry, and sends the generated command signal to said communication apparatus.

* * * * *

UNITED STATES PATENT AND TRADEMARK OFFICE
CERTIFICATE OF CORRECTION

PATENT NO. : 5,844,975
DATED : December 1, 1998
INVENTOR(S) : Naoki Sugawara, et al.

It is certified that error appears in the above-identified patent and that said Letters Patent is hereby corrected as shown below:

COLUMN 2

Line 3, "in order" should be deleted.

COLUMN 4

Line 24, "to" should be deleted;
Line 43, "to the" should read --the--; and
Line 56, "equality used" should read --used equally well--.

COLUMN 6

Line 49, "matter" should be deleted.

Signed and Sealed this

Seventeenth Day of August, 1999

Attest:

Q. TODD DICKINSON

*Attesting Officer*  *Acting Commissioner of Patents and Trademarks*